United States Patent [19]

Matsumoto

[11] 4,257,384
[45] Mar. 24, 1981

[54] INTAKE CONTROL APPARATUS OF ENGINE

[75] Inventor: Hiromitsu Matsumoto, Hamamatsu, Japan

[73] Assignee: Yamaha Hatsukoki Kabushiki Kaisha, Iwata, Japan

[21] Appl. No.: 951,119

[22] Filed: Oct. 13, 1978

[30] Foreign Application Priority Data

Oct. 27, 1977 [JP] Japan .................. 52/129297

[51] Int. Cl.³ ............................................. F02B 75/18
[52] U.S. Cl. .................................. 123/575; 123/577; 123/52 M
[58] Field of Search ............ 123/103 R, 127, 122 AB, 123/122 AC, 122 H, 575, 576, 75 B, 52 M; 261/23 A, 65 R, 39 A, 42, 63, 144, 145

[56] References Cited

U.S. PATENT DOCUMENTS

| | | | |
|---|---|---|---|
| 1,011,696 | 12/1911 | Winton | 261/65 |
| 1,767,031 | 6/1930 | Worthington | 123/122 A |
| 1,767,664 | 6/1930 | Geiger | 261/65 |
| 1,882,966 | 10/1932 | Schaffner | 261/65 |
| 2,296,172 | 9/1942 | Mallory | 261/65 |
| 2,737,375 | 3/1956 | Kittler | 261/65 |
| 3,338,568 | 8/1967 | Mangoletsi | 261/145 |
| 3,543,736 | 12/1970 | Suzuki | 123/122 H |
| 3,554,174 | 1/1971 | Clawson | 123/127 |
| 3,659,564 | 5/1972 | Suzuki | 123/127 |
| 4,002,704 | 1/1977 | Laprade | 261/23 A |
| 4,018,199 | 4/1977 | Furucz | 261/23 A |
| 4,117,808 | 10/1978 | Takamiya | 123/124 R |
| 4,151,820 | 5/1979 | Furacz | 123/127 |

FOREIGN PATENT DOCUMENTS

2617728 5/1977 Fed. Rep. of Germany ........ 261/23 A

Primary Examiner—Ronald H. Lazarus
Attorney, Agent, or Firm—Ernest A. Beutler

[57] ABSTRACT

An induction system for an internal combustion engine having both main and auxiliary induction passages serving a given cylinder. The auxiliary induction passage has a substantially smaller sectional area so that a charge delivered to the cylinder through this passage will enter the cylinder at a substantially higher velocity to improve combustion and efficiency. The flow ratio between the respective passages is controlled by a throttle valve arrangement. In accordance with an embodiment of the invention, the throttle valve arrangement consists of a pair of throttle valves positioned in a common passage and rotatable in opposite directions relative to each other. This opposite rotation increases turbulence and further aids in improving combustion. In accordance with another disclosed feature, a hot spot is provided for heating both the main and auxiliary induction passages. As a still further feature, the throttle valve that controls and directs the flow into the auxiliary induction passage is disposed in such a way as to insure complete diversion of fuel into the auxiliary induction passage during this phase of the operation.

6 Claims, 2 Drawing Figures

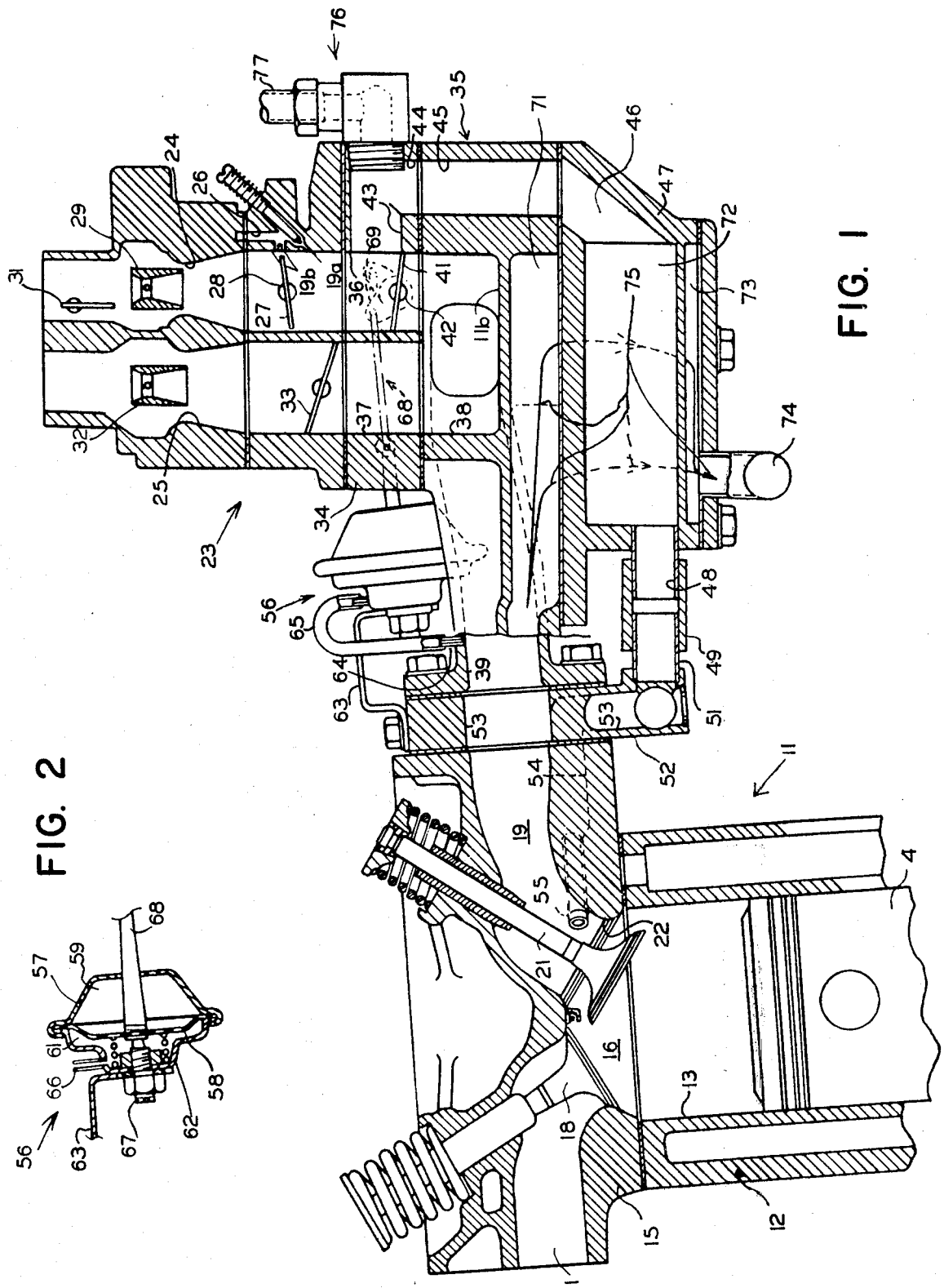

INTAKE CONTROL APPARATUS OF ENGINE

DESCRIPTION OF THE INVENTION

This invention relates to an internal combustion engine induction system and more particularly to an induction system that improves idle and low speed performance.

The design of an induction system for an internal combustion engine requires compromises with conventional systems. If the cross-sectional area intake passages are sufficiently large so as to minimize flow restriction and minimize volumetric efficiency and wide open throttle and volocity through the induction system and idle low low will be extremely low. This results in the likelihood of full condensation in the mixture before the mixture is delivered to the combustion chamber and slow burning. Normally, this condition is compensated for by providing an overly rich mixture at these running conditions. As a result, fuel consumption suffers and the emmission of unwanted exhaust constituents is increased.

In order to overcome these difficulties and provide good performance throughout the entire engine load range, it has been proposed to provide, in addition to the conventional relatively large main induction system, a smaller auxiliary or sub-intake system. A substantial portion or all of the idle and low speed mixture requirements of the engine is delivered through this auxiliary induction passage. As a result, high velocities are maintained and turbulance in the combustion chamber is promoted at the time of ignition. These high velocities insure against weakening of the mixture and promote high rates of flame propogation during combustion. As a result, engine performance is improved in terms of smoothness and economy and reduction of exhaust gas emissions.

The control of the proportion of the mixture flowing through the main and auxiliary induction system is adjusted in some instances through the use of throttle valves. In accordance with a first object of this invention the throttle valves are oriented and operated in such a manner as to further increase turbulance in the induction system and combustion chamber.

In accordance with another object of the invention, the throttle valve that diverts the flow into the auxiliary induction passage at low loads is oriented so as to insure complete diversion of both fuel and air.

In accordance with a further object of the invention, means are provided for good vaporization of the fuel in both main and auxiliary induction systems.

SUMMARY OF THE INVENTION

A first feature of the invention is adapted to be embodied is an internal combustion chamber having an intake passage for delivering a charge to the engine and having a pair of throttle valves rotatably opposed in the intake passage for controlling the flow therethrough. In accordance with this feature, the throttle valves are rotatable in opposite senses from their closed to their respective open position for increasing the turbulence in the charge flowing through the induction passage.

In accordance with another feature of this invention, an internal combustion engine is provided with an induction system consisting of a main intake passage and an auxiliary intake passage, each of which discharge through a combustion chamber. A charge forming device is adapted to discharge a fuel and air mixture through an inlet of the main intake passage. The auxiliary intake passage has its inlet in communication with the main intake passage posterior to the charge forming device. A throttle valve is juxt opposed to the air intake passage inlet in the main intake passage for diverting the least portion of the flow in the combustion chamber from the main intake passage through the auxiliary intake passage. In accordance with this feature of the invention, the throttle valve extends adjacent to the down stream of the air intake passage inlet when the throttle valve is closed so as to fully deflect the flow of mixture from the main intake passage into the auxiliary intake passage inlet under this condition.

A still further feature of the invention is adapted to be embodied for an induction system for an internal combustion engine. Main and auxiliary intake passages are provided for delivering a charge to a given chamber of the engine. A charge forming device is provided for delivering a charge to the intake passage. In accordance with this feature of the invention, heating means are provided for each of the intake passage downstream of the charge forming device for improving full vaporization.

BRIEF DESCRIPTION OF THE DRAWINGS

FIG. 1 is a longitudinal cross-sectional view taken through a single cylinder of a multiple cylinder internal combustion engine embodiment of this invention.

FIG. 2 is a cross-sectional view showing the throttle positioning device of the embodiment.

DETAILED DESCRIPTION OF THE PREFERRED EMBODIMENT

In the drawings, the reference numeral 11 indicates generally an internal combustion engine embodying this invention. Only the portions of the engine 11 have been shown that are necessary to understand the invention. Also, only a single cylinder of the engine and the induction system associated with it have been illustrated. As will become apparent, this invention is adapted in a number of ways to be embodied in conjunction with multiple cylinders.

The engine 11 includes a cylinder block 12 in which a plurality of cylinder bores are formed. Pistons 14 are slidably supported for reciprocation in the cylinder bores 13 and crank shaft (not shown) in a known manner.

A cylinder head 15 is affixed to the cylinder block 12 and has individual chambers 16 associated with each of the cylinder bores 13 and define with these cylinder bores 13 and the pistons 14 variable volume chambers.

An exhaust passage 17 is formed in one side of the cylinder head 15 extending from each of the chambers 16 to an exhaust manifold (not shown). An exhaust valve is provided for each exhaust passage 17 and is actuated in any known manner, such as an overhead cam shaft (not shown).

On the side of cylinder head 15 opposite to the exhaust passage 17, intake passages 19 are formed for each of the cylinder bores 13. Intake valves 21 cooperate with an intake port 22 formed in the end of each intake passage 19 for controlling the induction of a charge into a variable volume chamber including the cavity 16. The intake valves 21 are also operated in any known manner, such as by means of an overhead cam shaft (not shown).

A two-barrel staged carburetor 23 is provided a fuel/air charge to the variable volume chamber through a manifold arrangement to be described.

The carburetor 23 includes a primary 24 and a secondry barrel 25. As is well known in this art, the primary barrel 24 is provided with a fuel discharge system so as to supply the idle and off idle requirements of the engine. This arrangement includes an idle system in juxt opposed to the primary throttle vlve 27, which is rotatably supported in the barrel 24 upon the throttle barrel shaft 28. A main fuel discharge including a boost nozzle 29 is also provided in the primary brrel 24, as is also well known in this art. Upstream of the primary boost nozzle 29, a choke valve 31 is provided for cold starting enrichment. The choke valve 31 may be operated in any known manner.

The secondary barrel 31 is provided only with a main fuel discharge including boost nozzle 32. The flow through the secondary barrel 25 is controlled by a secondary throttle valve 33 positioned downstream of nozzle 32. The secondary throttle valve 33 is operated in stages with the primary throttle valve 28 in any known manner, such as by a mechanical linkage by means of a vacuum actuator or a combination of both methods.

The construction thus far described is conventional and, for that reason only, sufficient details necessary to understand the invention have been described. In accordance with this invention, a combined spacer plate and valve body indicated generally by the reference numeral 34 is interposed between the carburetor 23 and an intake manifold indicated generally by the reference numeral 35. The spacer plate 34 has a primary bore 36 and a secondary bore 37 that are aligned with the carburetor barrels 24 and 25 respectively. The bores 36 and 37 cooperate with a plenum chamber 38 of the manifold 35 from which manner runners 39 extend to the individual cylinder head intake passages 19 that are served by the carburetor 23. In the event only one carburetor is employed, it will, of course, serve all cylinder bores 13. Alternatively, multiple carburetors may be used in accordance with this invention as should become apparent to those skilled in the art.

Positioned in the bore 36 is an auxiliary throttle valve 41, which is rotatably supported upon a shaft 42. The auxiliary valve 41 is juxt opposed in its closed position to an auxiliary inlet passage intake 43 that is formed in the valve block and spacer 34. The auxiliary inlet passage extends from the inlet 43 to a right angle bend 44 that discharges into an auxiliary inlet passage 45 of the intake manifold 35. The passage 45 continues on into an auxiliary intake passage 46 formed in a lower body portion 47 of the manifold 35 from which a discharge pipe 48 extends. The discharge pipe 48 is connected by means of a flexible connection 49 to the inlet pipe 51 of a spacer block 52 that is interposed by the manifold 35 and the cylinder head 15. The spacer block 52 has a plurality of main intake passages 53 that connect the runners 39 with the cylinder head intake passages 19. In addition, an auxiliary induction passage 53, which receives a charge from the intake pipe 51, delivers this charge to auxiliary intake passage 54 formed in the cylinder head 15 for each cylinder bore 13. The cylinder head auxiliary intake passages 54 terminate on individual discharge bores 55 that are juxt opposed to their respective intake valves 21 for delivering a charge from the auxiliary induction system consisting of the auxiliary inlet passage intake 43, passages 44, 45, 46, pipes 48 and 51, and passages 53 and 54 and bores 55 to the cylinder bores 13.

The effective cross-sectional area of the described auxiliary induction system is considerably less than that of the main induction system, which main induction system consists of the plenum chamber 38, runners 39 and passages 53 and 19. As a result, a given mass flow of charge delivered to the cylinder bore 13 into the auxiliary intake passage and entering at a substantially greater velocity than the same mass flow through the main intake passage. As now to be described, the auxiliary throttle valve 41 operates in such a way as to deliver substantially all of the idle and off idle low load mixture remains to the engine through the auxiliary intake passage. This has been found to substantially improve engine performance under these conditions, since turbulance in the combustion chamber at the time of ignition is greatly increased. This increased turbulance has been foung to increase the speed of flame propogation which promotes smooth running, better fuel economy and reduction in the emission of unwanted exhaust gas constituents.

The throttle valve 41 is operated by an actuator indicated generally by the reference numeral 56 and shown in cross-sectional view of FIG. 2. The actuator 56 includes an actuator housing 57, in which a diaphragm 58 is clamped. The diaphragm 58 divides the interior of the housing 57 into an atmospheric chambr 59 and a vacuum chamber 61. A compression spring 62 is contained in the chamber 61 and urges the diaphragm 58 toward the right as shown in the figures, so as to tend to bias the throttle valve 41 to its fully open position, as will become apparent.

The actuator 56 is mounted by means of a bracket 63 to the spacer 52.

The chamber 61 of the actuator 56 is exposed to pressure or vacuum in the main induction system between the throttle valve 41 and the chambers 16. For this purpose, a pressure tap 64 is provided in the manifold 35 in communication with one of the runners 39. A flexible hose 65 transmitting this manifold pressure from the tap 64 to a nipple 66 that communicates with the chamber 61. Under conditions of high intake manifold vacuum in the main induction passage (low pressure), the diaphragm 58 will be urged to the left by the atmospheric pressure, which is vented to the chamber 59 and causes compression in the spring 52 and closure of the throttle valve 41 in a manner to be described. The maximum closure of the throttle valve 41 is limited by an adjustable stop 67 of the actuator assembly 68.

The diaphragm 58 is connected to the throttle valve 41 by means of an actuator rod 68 that is affixed to the center of the diaphragm 58 and which extends toward the body of the carburetor 23. The opposite end of the rod 68 is pivotally connected to a bell crank 69 that is affixed to shaft 42.

An arrangement is provided for heating both the main and auxiliary induction passages in order to improve fuel vaporization. For this purpose, a heating jacket or hot spot 71 is formed in the manifold 35 beneath the plenum 38 and above an enlarged chamber 72 of the auxiliary induction system. Engine coolant is delivered to the chamber 71 in any suitable manner. The heated water flows downwardly through a passage which does not appear in the drawing, but is to the rear of the auxiliary induction system 72. A further hearing chamber 73 receives this heated water and passes beneath the auxiliary induction chamber 72. This heated water is returned to the engine cooling system via a conduit 74 which receives the coolant from the chamber 73. The direction of coolant flow to provide this heating of the induction passages is shown by the arrows 75.

It has been found particularly effective in engines embodying exhuast gas recirculation to drive the recirculated exhaust gases into the auxiliary induction system. For this reason, a fitting 75 is provided that communicates with the portion of the auxiliary induction passage formed in the spacer 34. Exhaust gases to be recirculated or any other undesirable engine emissions that are desired to be recirculated through the induction chamber are driven through fitting 76 by means of a conduit 77.

In operation, FIG. 1 illustrates the condition of the engine during idle. The auxiliary throttle valve 41 will be substantially closed, its closed position being set by the adjustable stop 67 of the actuator 56. This closure is insured by the high vacuum that exists in the main induction system during idle. The secondary throttle valve 34 of the carburetor 23 will also be closed and the primary throttle valve 37 will be at its idling position. This idling position also is quite close to full closure. The idle fuel mixture will be delivered by the system 26 and flow downwardly through the barrel 24 and spacer bore 37 toward the throttle valve 41. The mixtue will be shunted by the throttle valve 41 to the auxiliary induction system inlet 43. It should be noted that peripheral edge of the throttle valve 41 is immediately adjacent to the peripheral edge of the auxiliary induction system inlet 43, so as to insure complete diversion of the fuel and air into the auxiliary induction passage. The idle charge will be delivered to the chamber 16 at a high velocity through the ports 55 when the intake valves 21 are open. This high velocity intake increases turbulence and, accordingly, economy, while at the same time inducing the emission of unwanted exhaust gas constituents as has been noted.

As the load of the engine increase and the primary throttle valve 27 is open, a point will be reached where the pressure in the main induction system, which is transmitted to the system and port 55 will be forced open to overcome the action of the spring 62. When this occurs, the auxiliary throttle valve 41 will begin to open and a portion of the mixture delivered from the barrel will be transmitted directly to the main induction system. It is to be noted that the passages 28 and 42 of the throttle valves 27 and 41 are parallel to each other. The throttle valve 27 opens through counter-clockwise rotation, whereas the throttle valve 41 opens through clockwise rotation. The opposite senses of rotation will cause turbulancce to be imparted to the mixture that is introduced into the main induction system. This turbulance is helpful in promoting rapid flame propogation, as has been previously noted, and this improves combustion and efficiency.

as the load in the engine increases and the throttle valve 27 moves toward its fully open position, eventually the induction system vacuum will be forced to overcome the action of the spring 62 and the auxiliary throttle valve 42 will move to its fully open position.

It should be readily apparent that the described construction provides extremely good operation throughout the engine load and speed range. Even under the extremely difficult idle conditions, full fuel vaporization is insured by the position of the auxiliary throttle valve 41 relative to the auxiliary induction system inlet 43, so that any fuel that tends to condense on the auxiliary throttle valve 41 will be swept by the flow into the auxiliary induction system for vaporization. This vaporization is insured by means of the heating system of the auxiliary induction system, which has been described. Furthermore, even when flow takes place through the main induction system at less than full loads, turbulance is induced in this induction system to improve efficiency by the opposite rotation of the throttle 27 and 41, thus providing a tortuous path through the main induction system.

It should be understood that although the invention has been described with a two-barrel carburetor, it is susceptible to use with other types of charge forming devices. Various other changes and modifications, without departing from the spirit and scope of the invention, will present themselves to those skilled in the art. The scope of the invention is described by the appended claims.

I claim:

1. An induction system for an internal combustion engine having a main intake passage for delivering a chrge to the engine, a charge forming device for delivering a fuel-air charge to said main intake passage, and a first throttle valve rotatably supported in said main intake passage downstream of the fuel discharge of said charge forming device for controlling the flow therethrough, a second throttle valve positioned in said main intake passage downstream of said first throttle valve, said second throttle valve being positioned in close proximity to said first throttle valve, an auxiliary induction passage having its inlet in communication with said main intake passage between said throttle valves, said auxiliary induction passage having its outlet in close proximity to the chamber of said engine for delivering charge directly to said chamber without substantially mixing externally of said chamber with the charge delivered thereto through said main intake passage, the improvement comprising said throttle valves being rotatable in opposite senses from their closed to their respective open position for increasing turbulence of the fuel-air charge flowing therepast for delivery to said engine chamber through said main intake passage.

2. An induction system as set forth in claim 1 wherein the throttle valves comprise butterfly-type valves, each affixed to a respective throttle valve shaft, said shafts being parallel to each other.

3. An induction system as set forth in claim 2 wherein the first throttle valve is positioned directly in the outlet end of the charge forming device.

4. An induction system as set forth in claim 2 wherein the second throttle valve is movable independently of the first throttle valve for directing a portion of the flow passing said first throttle valve into the auxiliary induction passage inlet when said second throttle valve is less than fully opened.

5. An induction system as set forth in claim 4 wherein the peripheral edge of the second throttle valve is juxtaposed to the downstream peripheral edge of the auxiliary induction passage inlet when said second throttle valves is in its closed position for preventing condensed fuel from accumulating on said downstream throttle valve.

6. An induction system for an internal combustion engine having a main induction passage for delivering a charge to the engine, a charge forming device for delivring a fuel-air charge to said main induction passage, a first throttle valve in said main induction passage downstream of the fuel discharge of said charge forming device, an auxiliary induction passage having its inlet in communication with a side wall of a vertically extending portion of said main induction passge downstream of said first throttle valve, said auxiliary induction passage being adapted to deliver a charge to the engine, a second throttle valve in said main induction passage downstream of said auxiliary induction passage inlet, said second throttle valve being inclined in said main induction passage when closed and having the top surface of its downstream peripheral edge juxtaposed to and no lower than the lower inside peripheral edge of the auxiliary induction passage inlet so that any fuel condensing on the upstream face of said second throttle valve, when in its closed position, will be directed into said auxiliary induction passage and so that no well will be formed between said top surfce and the vertical extending portion of said main induction passage wherein liquid fuel may accumulate.

* * * * *

UNITED STATES PATENT AND TRADEMARK OFFICE
CERTIFICATE OF CORRECTION

PATENT NO. : 4,257,384
DATED : March 24, 1981
INVENTOR(S) : Hiromitsu Matsumoto

It is certified that error appears in the above—identified patent and that said Letters Patent is hereby corrected as shown below:

Column 3, lines 4-5, "secondry" should be --secondary--;
Column 3, line 9, "vlve" should be --valve--; Column 3, line 12, "brrel" should be --barrel--. Column 4, line 19, "foung" should be --found--; Column 4, line 25, "of" should be --in--; Column 4, line 65, "drawing" should be --drawings--. Column 5, line 7, "exhuast" should be --exhaust--; Column 5, line 9, "75" should be --76--; Column 5, line 43, "port" should be --ports--; Column 5, line 58, "as" should be --As--.
Column 6, line 9, after "throttle" insert --valves--; Column 6, line 13, after "barrel" insert --stage--; Column 6, line 23, (Claim 1), "chrge" should be --charge--; Column 6, line 35, (Claim 1), after "delivering" insert --a--; Column 6, line 61, (Claim 5), "valves" should be --valve--; Column 6, line 67, (Claim 6), "livring" should be --livering--.
Column 7, line 4, (Claim 6), "passge" should be --passage--.
Column 8, line 7, (Claim 6), "surfce" should be --surface--.

Signed and Sealed this

Eighth Day of December 1981

[SEAL]

Attest:

Attesting Officer

GERALD J. MOSSINGHOFF
Commissioner of Patents and Trademarks